United States Patent [19]

Cuevas et al.

[11] 4,418,099
[45] Nov. 29, 1983

[54] NON-BURNISHED PRECIOUS METAL COMPOSITION

[75] Inventors: Danilo L. Cuevas, Kearney; Frank R. Russo, North Brunswick; Francis E. Schindler, East Brunswick, all of N.J.

[73] Assignee: Engelhard Corporation, Iselin, N.J.

[21] Appl. No.: 346,346

[22] Filed: Feb. 5, 1982

[51] Int. Cl.$^3$ ............................................... B06D 3/02
[52] U.S. Cl. .................................. 427/229; 106/1.23; 106/1.24; 106/1.25; 106/1.26; 106/1.28; 427/226
[58] Field of Search ............... 427/229, 226; 106/1.23, 106/1.24, 1.26, 1.25, 1.28

[56] References Cited

U.S. PATENT DOCUMENTS

| | | | |
|---|---|---|---|
| 2,842,457 | 7/1958 | Morgan | 106/1.23 |
| 3,266,912 | 8/1966 | Murphy | 427/229 |
| 3,313,632 | 4/1967 | Langley et al. | 106/1.23 |
| 3,345,199 | 10/1967 | Fitch | 427/229 |
| 3,391,010 | 7/1968 | Hauel | 427/229 |
| 3,811,925 | 5/1974 | Nesteruk | 106/1.23 |
| 4,192,666 | 3/1980 | Lupoi | 427/229 |
| 4,197,105 | 4/1980 | Hummel et al. | 427/229 |
| 4,262,040 | 4/1981 | Russo | 427/229 |

OTHER PUBLICATIONS

*The Condensed Chemical Dictionary*, 6th Ed., Rheinhold, N. Y.. 1961, pp. 52, 53, 154 and 155.

*Primary Examiner*—Norman Morgenstern
*Assistant Examiner*—Janyce A. Bell

[57] ABSTRACT

A composition containing a vehicle or solvent, one or more precious metal metallo-organic compounds, a base metal metallo-organic compound, and at least one non-metallic luster or pearlescent pigment; plus a method for obtaining lustrous burnish-like precious metal films on glass and ceramic substrate by applying and firing the composition onto the defined substrate.

26 Claims, No Drawings

NON-BURNISHED PRECIOUS METAL COMPOSITION

The invention relates to the use of non-metallic luster pigments in coatings for glass and ceramic and, in particular, to a decorative composition which produces a lustrous satin fired film having the appearance of a burnished finish without the need for burnishing.

BACKGROUND OF THE INVENTION

Various decorating compositions containing gold sulforesinates have been applied and fired onto glasses and glazed ceramics to obtain this, bright specular films. Such material is described, for instance, in U.S. Pat. Nos. 2,984,575 and 3,163,665.

In these patents, gold sulforesinates obtained by reacting a gold salt with a sulfurized organic moeity, such as a terpene hydrocarbon or an organic mercaptan, are dissolved in an organic solvent, such as an essential oil, exemplified by lavender or rosemary, and mixed with a suitable flux, such as a salt of bismuth, chromium, tin, vanadium, copper, titanium or zirconium. The resulting decorating compositions are found capable of forming a bright thin film of metallic bright gold when applied and fired onto glass or glazed ceramics at temperatures above about 450° C. The addition of small amounts of promoting agents and dopants to enhance the specularity and continuity of the resulting gold film is also permitted.

Where more elegant and expensive decorations are required, the gold decorating composition includes fine gold powders or flake, either with or without the gold sulforesinate component, along with an appropriate flux to obtain a substantially thicker, but dull fired film, which must be polished or burnished with wet sand or a dry fiberglass brush to obtain the desired satin luster. The latter type of decoration is generally termed "burnished gold," because of the polishing step. The satin luster and texture of burnished gold films, though elegant, are quite different from the much thinner, smooth, specular, bright gold films normally obtained by firing gold sulforesinates alone.

Both types of gold films have widespread appeal and utility, however, the sometimes tedious extra polishing required in the latter technique causes a thinning and weakening of the precious metal coating. In such case, redecorating, refiring and reburnishing may be needed to repair and salvage the product. Such, of course, is costly. In addition, the very fine particles resulting from polishing can become airborne and present a potential health hazard to the operator.

It is an object of the present invention to obtain a precious metal composition, such as gold, platinum or silver, which can be applied easily and conventionally on ceramic and glass substrates in the manner of bright gold coatings, but which, when fired, will provide a lustrous, adherent coating of the type and appearance of the expensive burnished metal without the above disadvantages and cost.

THE INVENTION

The above objects are obtainable in accordance with the present invention for obtaining a non-burnish satin precious metal finish on glass or ceramic (glazed or unglazed) by applying to the substrate a coating composition comprising, in combination:

(a) a vehicle or solvent, preferably an organic solvent, inclusive of essential oils and substituted aromatics in which various metallo-organic compounds, such as precious and base metal metallo-organic components, are soluble or can be suspended;

(b) at least one precious metal metallo-organic component, such as a resinate of gold, platinum, palladium, ruthenium, silver, or combinations thereof;

(c) at least one base metal metallo-organic component; and (d) at least one non-metallic luster pigment.

The above coating composition can include gold powder or flakes, as well as one or more promoters and dopants, such as metal oxides or corresponding metallo-organics, such as resinates, to improve luster, as well as durability and adhesion properties.

Vehicles useful for purposes of the present invention include, for instance, turpentine, polymerized turpentine (i.e., squeegee butter) essential oils, such as oils of rosemary, lavender, aniseed, sassafras, wintergreen and fennel, as well as substituted aromatics, such as o-nitrotoluene, benzyl acetate, and the like.

The precious metal metallo-organic "(b)" component usefully includes a gold metallo-organic compound, such as gold, gold/platinum, gold/palladium, gold/silver, gold/rhodium, as well as palladium, platinum and silver metallo-organics, or combinations thereof. For purposes of the present invention, such metallo-organics are usefully in the form of cyclic terpene mercaptides, sulforesinates or similar material, such as balsam (ref. U.S. Pat. Nos. 2,490,399, 3,163,665 and 2,984,575), with a loading of about 1–50 weight percent and preferably 1–30 weight percent precious metal.

The non-precious or base metal "(c)" component is best utilized as a metallo-organic compound preferably in the form of a resinate. Such component can include metals of classes 4a, 4b, 5a, 5b and 6b of the Periodic Table, but is not limited thereto. Examples of suitable metals include, for instance, antimony, bismuth, chromium, germanium, tin, titanium, vanadium, zirconium, iron, zinc, nickel, copper, cobalt, lead, manganese and molybdenum.

For purposes of the present invention, the non-metallic luster pigment "(d)," component can comprise a thin, flat non-metallic crystal, such as natural mica, mother-of-pearl, guanine or pigments, such as bismuth oxychloride and crystalline lead salts. Such can usefully vary in particle size from about 1–50 microns. Such materials are also referred to herein as non-metallic pearlescent pigments.

Some suitable commercial pearlescent pigments of the above include non-metallic Mearlin*, as well as Nacromer and Murano** pigments. The latter are conveniently obtainable in paste and powder form.
*Registered U.S. Trademark of the Mearl Corporation, New York, N.Y.
**Nacromer and Murano Bulletin PLC-301/2.

In the described invention, metallic shades and sheen are obtained without the use of metal flake. However, it is possible to incorporate gold as a powder or flake to further enhance the lustrous character of the resulting fired finish.

The refractory nature and high temperature resistance of the non-metallic pigments, however, are necessary to achieve the desired finish. Little physical change to the pigment should occur, therefore, during firing.

Conveniently, the non-metallic luster pigment can be added directly to a liquid gold, or similar composition, with gentle mechanical agitation, or added as an organic dispersion with similar mixing. It is also found convenient, for purposes of the present invention, to form an intermediate dispersion of the pigment component with a vehicle such as rosin, balsam or an organic plasticizer and the like, and roll milling 25-50 weight percent of pigment and vehicle over a roller paint mill. The amount of gold or other precious metal (i.e., "(b)" component) within the sulforesinate compound can conveniently vary widely, however, it is preferred that the concentration fall between 1-25 weight percent to maintain a proper finish commensurate with cost. The weight percent of rhodium metal, when used, can vary from 0.01 to 1.0, and the combined amount of base metal "(c)" component can usefully range from 0.1 to 5 weight percent. The amount of non-metallic luster pigment, "(d)" component, on the other hand, can vary from about 0.1 to 10 weight percent, and preferably 0.1-3 weight percent, to obtain the desired burnished effect. Generally, a pigment concentration below 0.1% results in a bright gold effect, and above 10% there is usually a pronounced loss of film adhesion, due to the refractory nature of the pigment. The amount of other precious metal resinates can vary, as needed, to change a satin gold film to white or off-shade gold tints of red or green.

Various techniques are known for applying the composition of the present invention to suitable substrate, such as spin coating, screen printing, brushing, spraying, rolling, stamping and the like. When the former technique is used, it is necessary that proper vehicle viscosity, as well as time and coater speed be carefully maintained to permit control over the amount applied to the substrate.

After applying each coat, the substrate can be dried under ambient or low temperature atmospheric conditions and conveniently fired within the range of about 450° C.-900° C. to obtain the desired finish.

This invention is further described in detail by reference to the following specific examples. It is understood that such embodiments are presented for illustration and are not intended to be illustrative of the invention as otherwise described or claimed herein.

EXAMPLE 1

Eleven (11) test components are prepared by admixing metal resinate solutions (including a metal flux) and pearlescent pigment suspended in oil in hereafter indicated amounts. The resulting compositions are painted onto test substrates (glazed ceramic or glass dinner plates, dried at about 120° C., and fired to 700° C. for fifteen minutes to obtain lustrous metallic finishes of various shading as set out in tests #1-11 infra.

TEST #1

Satin Gold - Applied by Brush

| Composition Ingredients | Parts by Weight |
| --- | --- |
| Gold sulfurized balsam (24 percent Au) | 100 |
| Rhodium resinate (1 percent Rh) | 6 |
| Bismuth resinate (4.5 percent Bi) | 5 |
| Chromium resinate (4 percent Cr) | 1 |
| Oil Rosemary | 4 |
| Cyclohexanone | 4 |
| Mearlin White Pearlescent Pigment in Oil (33 percent solids) | 5 |
| | 125 |

The composition, as applied to a glazed ceramic dinner plate, contains 19.20 percent* gold, 0.048 percent Rh, 0.21 percent base metals and 1.32 percent non-metallic luster pigment. The resulting coated substrate has a smooth uniform lustrous yellow satin gold finish with good adhesion and scratch resistance.

*by weight.

TEST #2

Satin Green Gold - Applied by Brush

| | Composition Ingredients | Parts by Weight |
| --- | --- | --- |
| (A) | Gold sulfurized balsam (24 percent Au) | 60.0 |
| | Rosin dissolved in turpentine (50 percent solids) | 20.0 |
| | Silver resinate (30 percent Ag) | 16.7 |
| | Oil Rosemary | 13.7 |
| | Rhodium resinate (1 percent Rh) | 5.0 |
| | Mearlin White Pearlescent pigment in oil (33 percent solids) | 4.6 |
| | Bismuth resinate (4.5 percent Bi) | 4.0 |
| | Chromium resinate (4 percent Cr) | 1.0 |
| | | 125.0 |

The composition, as applied to a glazed ceramic plate, contains 11.5 percent gold, 4 percent silver, 0.04 percent rhodium, 0.17 percent base metal and 1.2 percent non-metallic pigment. A smooth uniform satin green-gold finish was obtained.

(B)

The composition of (A) is also applied to a clear soda-lime glass test substrate, dried as before, but fired at 550° C. to obtain an opaque lustrous satin green-gold film.

TEST #3

Satin Palladium (White Gold) - Applied by Brush

| Ingredients | Parts by Weight |
| --- | --- |
| Palladium resinate (15 percent Pd) | 12.5 |
| Gold sulfurized balsam (24 percent Au) | 60.0 |
| Rosin dissolved in turpentine (50 percent solids) | 20.5 |
| Oil Rosemary | 13.0 |
| Rhodium resinate (1 percent Rh) | 5.0 |
| Silver resinate (30 percent Ag) | 4.2 |
| Bismuth resinate (4.5 percent Bi) | 4.0 |
| Mearlin White Pearlescent pigment in oil (33 percent solids) | 3.8 |
| Chromium resinate (4 percent Cr) | 1.0 |
| Tin resinate (4 percent Sn) | 1.0 |
| | 125.0 |

The composition, as applied to glazed ceramic plate, contains 11.52 percent gold, 1.00 percent silver, 1.50 percent palladium, 0.04 percent rhodium and 1.01 percent non-metallic pigment. A smooth uniform satin white-gold finish is obtained.

TEST #4

Satin Platinum (White Gold) - Applied by Brush

| | Composition Ingredients | Parts by Weight |
| --- | --- | --- |
| (A) | Platinum resinate (12 percent Pt) | 20.8 |
| | Gold sulfurized balsam (24 percent Au) | 52.0 |
| | Rosin dissolved in turpentine (50 percent solids) | 20.7 |
| | Oil Rosemary | 13.0 |
| | Rhodium resinate (1 percent Rh) | 5.0 |
| | Mearlin White Pearlescent pigment in oil (33 percent solids) | 4.5 |
| | Bismuth resinate (4.5 percent Bi) | 4.0 |
| | Ortho Nitrotoluene | 3.0 |
| | Chromium resinate (4 percent Cr) | 1.0 |
| | Tin resinate (4 percent Sn) | 1.0 |
| | | 125.0 |

The composition, applied to glazed ceramic substrate, contains 10 percent gold, 0.04 percent rhodium, 2 percent platinum and 1.2 percent non-metallic pigment. A smooth uniform satin white-gold finish is obtained.

(B)

The composition of (A) is also applied to clear soda-lime glass substrate, dried as before, but fired at 600° C. to obtain an opaque lustrous satin white finish.

TEST #5

Satin Gold Composition - Applied by Roller and Stamper

| Composition Ingredients | Parts by Weight |
|---|---|
| (A) Gold sulfurized balsam (24 percent Au) | 100 |
| Sulfurized balsam | 10 |
| Sulfurized rosin | 10 |
| Mearlin White Pearlescent pigment in oil (33 percent solids) | 10 |
| Oil Amyris | 8 |
| Rhodium resinate (1 percent Rh) | 6 |
| Bismuth resinate (4.5 percent Bi) | 5 |
| Chromium resinate (4 percent Cr) | 1 |
| | 150 |

The above composition is steam-heated to a viscous dispersion (100 poise*). The material, as applied by hard rubber roller to glazed dinner plate, comprises 19.20 percent gold and 2.66 percent non-metallic pigment, dried as in previous tests, and fired at 700° C.
*As measured on a Ferranti-Shirley Viscosimeter.

(B)

The composition of (A) was similarly applied to a glazed ceramic test plate by rubber stamping, then dried and fired at 700° C. as before to obtain substantially similar results.

TEST #6

Satin Gold Composition - Applied by Screen and Direct Printing

| Composition Ingredients | Parts by Weight |
|---|---|
| (A) Gold dodecyl mercaptide (28 percent Au) | 50 |
| Squeegee butter (polymerized turpentine) | 43 |
| Sulfurized balsam | 10 |
| Sulfurized rosin | 10 |
| Rhodium resinate (1 percent Rh) | 5 |
| Bismuth resinate (4.5 percent Bi) | 4 |
| Mearlin White Pearlescent pigment in oil (33 percent solids) | 2 |
| Chromium resinate (4 percent Cr) | 1 |
| | 125 |

The above composition is milled on a three-roller paint mill, until a uniform viscosity of 2500 dynes/cm$^2$ is obtained, comprising 11.20 percent gold and 0.53 percent non-metallic pigment. The composition is screen printed through a 306 nitex mesh screen on a glazed ceramic tile, dried and fired at 700° C. to achieve a smooth uniform, satin gold lustrous finish.

(B)

The composition of (A) is also screen printed on decal paper, dried and cover-coated with a plastic overlayer. The decal is then released in water, applied to a glazed ceramic plate, dried and fired at 700° C. for 15 minutes to obtain results comparable to Test #6(A).

TEST #7 (CONTROL)

Test #1 is repeated, except that the composition, as applied, contained 15 parts by weight pearlescent pigment (50% solids) rather than 5, and 90 parts by weight gold, rather than 100.

The composition, as brush-applied to two glazed ceramic plates, comprises 17.28 percent gold and 6 percent non-metallic luster pigment. The plates are then dried and each fired at 700° C. and 800° C., respectively, for 15 minutes. A smooth lustrous satin gold film was obtained in each case, which had poor adhesion to the substrate. The films are easily scratched off with a fingernail rub.

A repeat of Test #7 with additional flux (i.e., to 1 percent base metals), results in substantially better adhesion, but a dull gold finish is obtained.

TEST #7A (CONTROL)

Test #1 is repeated using a composition containing no pearlescent pigment. The resulting ceramic dinner plate is directly compared with the plate of Test #1, and found to lack satin luster, but exhibit a bright, specular film.

TEST #8

Copper Gold—Applied by Brush (A)

Test #1 is repeated, using 1.32 percent of a copper non-metallic luster pigment applied to a glazed ceramic plate in place of the white pearlescent pigment of Test #1. The resulting dried and fired substrate exhibits a lustrous satin copper metallic shade of gold.

(B)

Additional lustrous satin shades of gold are attained by substituting 1.32 percent by weight of silver, red, yellow and gunmetal non-metallic luster pigments in place of the white pearlescent pigment of Test #1.

TEST #9

Satin Gold—Applied by Brush

Test #1 is repeated, except that the composition is modified by adding vanadium resinate (1 part by weight of 4%) and Mearlin bismuth oxychloride in turpentine (4 parts by weight of 50% suspension), substituted for white pearlescent pigment. The composition, as applied by brush, comprises 19.2 percent gold and 1.6 percent bismuth oxychloride pigment. A smooth lustrous satin gold film is obtained.

TEST #10

Satin Platinum - Applied by Brush

| Ingredients | Parts by Weight |
|---|---|
| Platinum Resinate (12 percent Pt) | 75.0 |
| Bismuth Resinate (5 percent Bi) | 13.0 |
| Benzyl Acetate | 6.4 |
| Ethyl Acetate | 6.0 |
| Mearlin White Pearlescent Pigment in Oil (33 percent solids) | 6.0 |
| Oil Cloves | 6.0 |
| Rosin dissolved in turpentine (50 percent solids) | 5.0 |
| Tin Resinate (4 percent Sn) | 1.4 |
| Rhodium Resinate (5 percent Rh) | 1.2 |
| | 120.0 |

The above composition, as applied to a glazed ceramic dinner plate, contains 7.5 percent platinum, 0.05 percent rhodium, 0.6 percent base metals and 1.65 percent non-metallic pigment. The resulting coated plate has a smooth, uniform satin white burnish effect after firing at 700° C.

TEST #10A (CONTROL)

Test #10 is repeated, using the same composition, but with no white pearlescent pigment. The resulting dinner plate, after firing at 700° C. has a bright, specular finish with no satin luster.

TEST #11

Non-Burnished Satin Silver - Applied by Spray

| Ingredients | Parts by Weight |
|---|---|
| Chlorothene (Dow Chemical) | 55.50 |
| Silver Resinate (25 percent Ag) | 20.00 |
| Rosin Dissolved in Spike Oil (50 percent solids) | 15.00 |
| Mearlin White Pearlescent Pigment in Oil (33 percent solids) | 4.00 |
| Rhodium Resinate (10 percent Rh) | 3.00 |
| Dibutylamine | 1.80 |
| Silicon Resinate (20 percent Si) | 0.25 |
| Titanium Resinate (12 percent Ti) | 0.25 |
| Solvenol #1 (Hercules Co.) | 0.20 |
|  | 100.00 |

The above composition containing (by weight) 5.0 percent silver, 0.02 percent rhodium, 0.08 percent base metals, and 1.32 percent non-metallic luster pigment, is spray-applied to soda-lime glassware. The resulting test plate, after drying and firing at 500° C. for fifteen minutes, has a uniform, white satin finish.

TEST 11A (CONTROL)

Test #11 is repeated with a composition containing no white pearlescent pigment. The resulting glassware was found to lack satin luster, but instead, had a bright mirror finish.

What we claim is:

1. A coating composition for glass or ceramic which, when fired, produces a lustrous satin burnished appearance without burnishing which comprises in combination:
   (a) a vehicle or solvent;
   (b) at least one precious metal metallo-organic component;
   (c) at least one base metal metallo-organic component; and
   (d) at least one non-metallic luster pigment.

2. The composition of claim 1 wherein the "(b)" component comprises a resinate of gold, platinum, palladium, ruthenium, silver, or combinations thereof.

3. The composition of claim 2 wherein the "(b)" component is a gold sulforesinate.

4. The composition of claim 2, wherein the "(b)" component contains gold with a one member selected from the group consisting of a ruthenium-, platinum-, palladium- and silver-metallo-organic.

5. The composition of claim 2 wherein the "(b)" component contains a gold-, a platinum-, a palladium-, or a silver-metallo-organic.

6. The composition of claim 1 wherein the "(c)" component containing at least one metallo-organic of an element within classes 4A, 4b, 5a, 5b and 6b of the Periodic Table.

7. The composition of claim 1 wherein the "(c)" component comprises at least one resinate of a metal selected from the group consisting of antimony, bismuth, chromium, germanium, tin, titanium, vanadium, zirconium, iron, zinc, nickel, copper, cobalt, lead, manganese, and molybdenum.

8. The composition of claim 1 wherein the "(d)" component comprises a non-metallic luster pigment present in a concentration of about 0.1–10 weight percent.

9. The composition of claim 1 wherein the "(d)" component comprises a non-metallic luster pigment present in a concentration of about 0.1–3 weight percent.

10. The composition of claim 2 wherein the "(d)" component is present in a concentration of about 0.1–3 weight percent.

11. The composition of claim 1 wherein the "(d)" component comprises a non-metallic luster pigment of mica containing thin, flat, transparent platelets of alkali alumina silicates.

12. The composition of claim 8 wherein the "(b)" component comprises gold sulfurized balsam and rhodium resinate.

13. The composition of claim 8 wherein the "(b)" component comprises palladium resinate and gold sulfurized balsam.

14. The composition of claim 8 wherein the "(d)" component comprises at least one of mica, mother-of-pearl, guanine, bismuth oxychlorides and crystalline lead salts in the form of thin platelets.

15. The composition of claim 8 wherein the "(b)" component comprises gold sulfurized balsam and platinum resinate.

16. The composition of claim 8 wherein the "(b)" component comprises gold sulfurized balsam and silver resinate.

17. The composition of claim 8 wherein the "(b)" component comprises a gold alkyl mercaptide and rhodium resinate.

18. The composition of claim 1 wherein the "(d)" component comprises non-metallic luster pigments consisting of thin platelets or crystals coated with a metal oxide.

19. The composition of claim 1 wherein the "(a)" component is at least one of an essential oil, turpentine or a substituted aromatic solvent.

20. A process for producing a non-burnished satin precious metal finish on a glass or ceramic substrate comprising applying onto said substrate a composition as defined in claim 1; and thereafter drying and firing at about 450° C.–900° C. to obtain the desired lustrous satin finish without burnishing.

21. The process of claim 20 wherein the substrate is of glass substrate and the coating composition comprises a gold metallo-organic.

22. The process of claim 20 wherein the substrate is a glazed or unglazed ceramic and the coating composition comprises a gold metallo-organic.

23. The process of claim 20 wherein the substrate is a porcelainized metal and the coating composition comprises a gold metallo-organic.

24. The process of claim 21 wherein the metallo-organic is sulforesinate.

25. The process of claim 22 wherein the metallo-organic is in the form of a resinate.

26. The process of claim 23 wherein the metallo-organic is in the form of a resinate.

* * * * *